United States Patent
Agapiou et al.

(10) Patent No.: US 10,351,753 B2
(45) Date of Patent: Jul. 16, 2019

(54) CORROSION-RESISTANT REFRACTORY BINDER COMPOSITIONS AND OIL WELL COMPLETION AND PRODUCTION OPERATIONS

(71) Applicant: Halliburton Energy Services, Inc., Houston, TX (US)

(72) Inventors: Kyris Agapiou, Houston, TX (US); Ben Iverson, Akron, OH (US); Sam Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 14 days.

(21) Appl. No.: 15/037,575

(22) PCT Filed: Dec. 18, 2013

(86) PCT No.: PCT/US2013/076048
§ 371 (c)(1),
(2) Date: May 18, 2016

(87) PCT Pub. No.: WO2015/094218
PCT Pub. Date: Jun. 25, 2015

(65) Prior Publication Data
US 2016/0298016 A1  Oct. 13, 2016

(51) Int. Cl.
*E21B 33/14* (2006.01)
*C09K 8/467* (2006.01)
(Continued)

(52) U.S. Cl.
CPC .............. *C09K 8/467* (2013.01); *C04B 28/06* (2013.01); *C04B 28/34* (2013.01); *C04B 28/344* (2013.01);
(Continued)

(58) Field of Classification Search
None
See application file for complete search history.

(56) References Cited

U.S. PATENT DOCUMENTS

| | | | | |
|---|---|---|---|---|
| 2,416,700 A | * | 3/1947 | Kocher | .................. C04B 14/04 501/124 |
| 2,558,782 A | * | 7/1951 | Ratcliffe | ................ C04B 35/18 501/124 |

(Continued)

FOREIGN PATENT DOCUMENTS

| | | |
|---|---|---|
| JP | H04-304321 A | 10/1992 |
| JP | H11-157908 A | 6/1999 |
| WO | 98/030513 A1 | 7/1998 |

OTHER PUBLICATIONS

Hubbard et al. "Pulverized-Fuel Ash for Concrete: Compositional Characterization of United Kingdom PFA" Cement and Concrete Research vol. 15, pp. 185-198, 1985.*

(Continued)

*Primary Examiner* — William D Hutton, Jr.
*Assistant Examiner* — Charles R Nold
(74) *Attorney, Agent, or Firm* — Thomas Rooney; Baker Botts L.L.P.

(57) ABSTRACT

Corrosion-resistant refractory binder compositions may include high alumina cement, high-alumina refractory aluminosilicate material, and phosphorous material. Examples of high-alumina refractory aluminosilicate material include crushed firebrick, firebrick grog, refractory mortar, fire clay, mullite, fused mullite, and combinations thereof. The binder composition may be mixed with sufficient amount of fluid such as water to form a slurry and introduced into a wellbore penetrating a subterranean formation, where it may be allowed to set at a point downhole. Such compositions, once set, may exhibit enhanced corrosion and heat resistance. Such compositions, once set, may additionally be cured.

(Continued)

Curing may take place at higher temperatures and/or pressures, and may furthermore increase temperature resistance and/or strength of the set binder composition. In addition, the inclusion of high-alumina refractory aluminosilicate material may provide for enhanced consistency in such binder compositions formulated from different batches of high-alumina refractory aluminosilicate material.

16 Claims, 5 Drawing Sheets (51) Int. Cl.
 *C04B 28/06* (2006.01)
 *C04B 28/34* (2006.01)
 *C09K 8/473* (2006.01)
(52) U.S. Cl.
 CPC .............. *C09K 8/473* (2013.01); *E21B 33/14* (2013.01); *C09K 2208/08* (2013.01); *C09K 2208/32* (2013.01); *Y02W 30/96* (2015.05)

(56) References Cited

U.S. PATENT DOCUMENTS

| | | | | |
|---|---|---|---|---|
| 4,098,614 | A * | 7/1978 | Ray | C04B 24/003 |
| | | | | 106/717 |
| 4,394,175 | A * | 7/1983 | Cheriton | C04B 28/06 |
| | | | | 106/695 |
| 4,806,168 | A | 2/1989 | Ivarsson et al. | |
| 6,458,732 | B1 | 10/2002 | Doza et al. | |
| 2002/0050231 | A1 | 5/2002 | Brothers et al. | |
| 2005/0109507 | A1 * | 5/2005 | Heathman | C04B 28/02 |
| | | | | 166/292 |
| 2013/0210605 | A1 | 8/2013 | Decker | |
| 2013/0284069 | A1 * | 10/2013 | Dubey | C04B 7/32 |
| | | | | 106/695 |

OTHER PUBLICATIONS

Brothers et al. "Mullite Microsphere Filled Lightweight Calcium Phosphate Cement Slurries for Geothermal Wells: Setting and Properties", Cement and Concrete Research. vol. 25, No. 6, pp. 1305-1310, 1995.*
Chappex et al. "Alkali fixation of C—S—H in blended cement pastes and its relation to alkali silica reaction"; Cement and Concrete Research 42 (2012).*
Mileiko et al. "Single Crystalline Mullite fibers obtained by the internal crystallization method; Microstructure and creep resistance", Journal of the European Ceramic Society 29 (2009) 337-345.*
Harbison-Walker Handbook of Refractory Practice 2005; pp. 1-15 and MP-11 to MP22.*
International Preliminary Report on Patentability issued in related Application No. PCT/US2013/076048, dated Jun. 30, 2016 (11 pages).
Written Opinion issued in related PCT Application No. PCT/US2013/076048 dated Sep. 26, 2014, 13 pages.
International Search Report issued in related PCT Application No. PCT/US2013/076048 dated Sep. 26, 2014, 4 pages.
Pidwirny, M., "Physical and Chemical Characteristics of Seawater". Fundamentals of Physical Geography, 2nd Edition (2006), last accessed Jun. 18, 2018, http://www.physicalgeography.net/fundamentals/8p.html (2 pages).

* cited by examiner

CORROSION-RESISTANT REFRACTORY BINDER COMPOSITIONS AND OIL WELL COMPLETION AND PRODUCTION OPERATIONS

CROSS-REFERENCE TO RELATED APPLICATION

The present application is a U.S. National Stage Application of International Application No. PCT/US2013/076048 filed Dec. 18, 2013, which is incorporated herein by reference in its entirety for all purposes.

BACKGROUND

The present disclosure relates generally to cementing and other subterranean operations using binder compositions and, more particularly, to binder compositions demonstrating improved corrosion and heat resistance; and to associated methods of using forming such compositions.

Binder compositions may be used in a variety of subterranean applications. An example of a subterranean application that utilizes binder compositions is primary cementing whereby pipe strings, such as casing and liners, are cemented in well bores penetrating subterranean formations. In performing primary cementing, a binder composition may be pumped into an annular space between the walls of a well bore and the exterior surface of the pipe string disposed therein. The binder composition sets in the annular space, thereby forming therein an annular sheath of hardened cement (i.e., a cement sheath) that supports and positions the pipe string in the well bore and bonds the exterior surface of the pipe string to the walls of the well bore. Binder compositions also may be used in remedial cementing operations, for example, to seal cracks or holes in pipe strings, to seal highly permeable zones or fractures in subterranean formations, and the like. Binder compositions also may be used in surface applications, for example, construction cementing.

Binder compositions such as those employed in well bores may encounter a range of temperature and pressure conditions, and may additionally be exposed to a variety of corrosive agents such as carbon dioxide, flowing acid, and the like. For example, carbonic acid ($H_2CO_3$) may be produced by reaction of subterranean water and carbon dioxide ($CO_2$), which may be naturally present and/or injected (e.g., in a $CO_2$-enhanced recovery operation) into the well. Carbonic acid is believed to react with calcium hydroxide that may be present in some cements (e.g., Portland cement), which reaction may corrode the cement, thereby potentially causing deterioration of the set cement. This could increase the permeability of the set cement, which could in turn allow permeation of compounds from a subterranean formation (e.g., chloride and hydrogen sulfide ions) through the cement and to the casing, which in turn may corrode the casing and cause undesirable interzonal communication of fluids. Corrosion problems may be especially pronounced in high temperature environments, such as high temperature wells (e.g., geothermal wells), which typically involve high temperature, high pressure, and high concentration of carbon dioxide. In such wells, cement failures may occur in less than five years, causing the collapse of the well casing. This, in turn, may cause lost production and may necessitate expensive casing repairs.

While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates generally to cementing and other binder composition operations and, more particularly, to binder compositions demonstrating improved corrosion and heat resistance; and to associated methods of forming and of use.

Binder compositions according to some embodiments of the present disclosure may comprise: (i) a cement comprising a high alumina cement, a high-alumina refractory aluminosilicate material, and a phosphorous material; and (ii) water sufficient to form a pumpable slurry.

The binder compositions of some embodiments generally may have a density ranging from about 5 lb/gal to about 25 lb/gal. In some embodiments, a lower end of density of the binder composition may be any one of about 5, 6, 7, 8, 9, 10, 11, 12, 13, 14, 15, 16, 17, 18, 19, and 20 lb/gal, and non-integer intervals in between any two of the preceding numbers. An upper end of density of the binder compositions of some embodiments may be any one of about 7, 8, 9, 10, 11, 12, 13, 14, 15, 16, 17, 18, 19, 20, 21, 22, 23, 24, and 25 lb/gal, and non-integer intervals in between any two of the preceding numbers. Thus, for example, binder composition density according to some embodiments may be from about 8 lb/gal to about 17 lb/gal. In other embodiments, it may be from about 6 lb/gal to about 22 lb/gal, etc. In certain embodiments, binder compositions may include settable binder compositions such as cement compositions, such as for example calcium aluminophosphate cements (CAPCs). In some embodiments, binder compositions may be or may include low-density settable binder compositions, such as foamed cement compositions or binder compositions comprising microspheres.

As noted, the binder compositions of some embodiments may comprise a cement comprising a high alumina cement, a high-alumina refractory aluminosilicate material, and a phosphorous material. In certain embodiments, that cement may be at least partially unhydrated. Any high alumina cements suitable for use in subterranean applications may be suitable for use. As referred to herein, the term "high alumina cement" will be understood to mean a cement having an alumina concentration within the range of about 40% to about 80% of the weight of the high alumina cement. In some embodiments, a suitable high alumina cement may comprise a calcium aluminate cement (CAC). Examples of suitable high alumina cements include, but are not limited to, commercially available high alumina cements such as those available under the trade names "SECAR® 51," "SECAR® 60," "SECAR® 71," "SECAR® 712," "SECAR® 80," and/or "CIMENT FONDU®" cements, commercially available from KERNEOS™ Aluminate Technologies; as well as CA-14 and/or CA-270, commercially available from ALMATIS™ Premium Alumina.

In certain embodiments, the high alumina cement may be present in the binder compositions in the range of from about 20% to about 70% by weight of cement (bwoc). As used herein, "by weight of cement" and "bwoc" refer to a weight percentage of the unhydrated cement (e.g., the sum of the high alumina cement, the high-alumina refractory aluminosilicate material, and the phosphorous material). The low end of the range of high alumina cement present in some embodiments may be any one of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, and 65% bwoc. In some embodiments, the low end of the range of the high alumina cement present may be a non-integer, such as any interval of tenths of percentages (or other interval) between any two of the immediately aforementioned numbers (e.g., 32.4% bwoc, 47.5% bwoc, 48.6% bwoc, etc.). The high end of the range of high alumina cement present in some embodiments may be any one of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70% bwoc. The high end of the range of the high alumina cement may likewise, in some embodiments, be a non-integer, such as any interval of tenths of percentages (or other interval) between any two of the immediately aforementioned numbers (e.g., 29.15% bwoc, 47.5% bwoc, 48.6% bwoc, 59.68% bwoc, etc.). Thus, suitable exemplar ranges according to the foregoing may include, e.g., about 45.1%-48.5% bwoc; about 20.15%-25.20% bwoc; about 65.00%-70.00% bwoc; etc.

The binder composition and/or cement may further comprise a high-alumina refractory aluminosilicate material. As used herein, the term "high-alumina refractory aluminosilicate material" means a material having a ratio of Alumina to silica (or A:S) greater than about 0.7, and deriving from refractory material such as firebrick. The ratio of alumina to silica in some embodiments may be greater than 1, and in certain embodiments can be as high as at least 17. In other words, the high-alumina refractory aluminosilicate material may comprise more alumina than silica, and in some cases substantially more alumina than silica. Examples of high-alumina refractory aluminosilicate material include, but are not limited to, crushed firebrick; firebrick grog; refractory mortar; fire clay; mullite; fused mullite; and combinations thereof, among others. The high-alumina refractory aluminosilicate material may in some embodiments serve as a low-cost supplement to the high alumina cement. In some instances, higher alumina content in the binder composition may correspond to greater heat resistant properties, which may be advantageous in high temperature applications (e.g., well bores including temperatures of about 200° F. or higher). Some high-alumina refractory aluminosilicate materials such as crushed firebrick and firebrick grog may include crystalline structures as opposed to the amorphous structures of some other aluminosilicate materials. Furthermore, some high-alumina refractory aluminosilicate materials, such as crushed firebrick, firebrick grog, etc., may exhibit substantial consistency in their properties among materials obtained from different sources. This could provide several advantages over other fillers, such as siliceous fillers like fly ash incorporated into other binder compositions. For instance, different batches of "fly ash" (which refers to the finely divided residue that results from the combustion of ground or powdered coal and that is carried by, e.g., flue gases generated by power plants) may exhibit significantly different properties due to the waste product nature of fly ash. In particular, fly ash may be contaminated with any one or more of lime, cement, gypsum, CaO, and $SiO_2$, among others. This and other inconsistencies could result in the need to perform testing and modification of cement formulations each time a different batch of fly ash is obtained and incorporated into the binder composition. The use of substantially consistent material, such as firebrick grog, may on the other hand enhance the consistency (and thereby reduce the need for repetitive testing and/or reformulation) of binder compositions, even when different batches and/or different sources of firebrick grog are used. This advantage may be particularly pronounced in some low-temperature applications (e.g., under about 200° F.) where cement materials including filler such as fly ash may yield unpredictable results.

The inclusion of a high-alumina refractory aluminosilicate material such as crushed firebrick and/or firebrick grog in some embodiments may result in a binder composition that, once set and/or cured, contains a higher amount of aluminum- and/or alumina-containing species relative to cement and other binder compositions instead employing fillers such as fly ash, pumice, shale, or the like. Similarly, the inclusion of high-alumina refractory aluminosilicate material may significantly reduce or substantially eliminate the amount of amorphous material present in the set binder composition (e.g., set cement), and furthermore may lead to a reduced amount of quartz present in the set cement, thereby resulting in enhanced properties such as compressive strength and/or set time. High-alumina refractory aluminosilicate materials according to some embodiments may furthermore impart high temperature stability and corrosion resistance to the binder composition. This may in some instances be due to species such as mullite, corundum, etc. present in high-alumina refractory aluminosilicate materials according to some embodiments. High-alumina refractory aluminosilicate materials such as crushed firebrick and firebrick grog may impart inherent heat and chemical resistance to a binder composition including such materials. Table 1 below shows X-ray diffraction ("XRD") compositional analysis of various components that may be included in binder compositions, including some components present due to the inclusion of high-alumina refractory aluminosilicate material. Specifically, Table 1 compares the composition in wt % of a high-alumina refractory aluminosilicate material (in Table 1, firebrick grog "FBG") with each of: cement kiln dust (CKD), fly ash (Fly Ash F), pumice, and shale. Table 2 shows a full oxide analysis of the firebrick grog compared to the other aforementioned binder compositions.

TABLE 1

XRD of Various Binder Composition Components

|  |  | FBG | CKD | Fly Ash F | Pumice | Shale |
| --- | --- | --- | --- | --- | --- | --- |
| Calcite | $CaCO_3$ | — | 53% | — | — | — |
| Quartz | $SiO_2$ | 2% | 19% | 19% | — | 62% |
| Lime | CaO | — | 8% | — | — | — |
| Anhydrite | $CaSO_4$ | — | 5% | — | — | — |
| Arcanite | $K_2SO_4$ | — | 4% | — | — | — |
| Kaolinite | — | — | 4% | — | — | — |
| Dolomite | $CaMg(CO_3)_2$ | — | 3% | — | — | — |
| Muscovite | — | — | 3% | — | — | trace |
| Pyrite | $FeS_2$ | — | 1% | — | — | — |
| Mullite | $Al_6Si_2O_{13}$ | 69% | — | 26% | — | — |
| Corundum | $Al_2O_3$ | 27% | — | — | — | — |
| Cristobalite | $SiO_2$ | 1% | — | — | — | — |
| Augite | $(Ca,Na)(Mg,Al,Fe,Ti)(Si,Al)_2O_6$ | — | — | — | — | 5% |
| K-feldspar | $KAlSi_3O_8$ | 1% | — | — | — | 9% |
| Na-feldspar | $NaAlSi_3O_8$ | — | — | — | — | 5% |
| Magnetite | $Fe_3O_4$ | — | — | 8% | — | — |
| Hematite | $Fe_2O_3$ | — | — | 5% | — | — |
| Amorphous | non-crystalline | — | — | 42% | 100% | 13% |

TABLE 2

Full Oxide Analysis of Binder Compositions

|  | FBG | CKD | Fly Ash F | Pumice | Shale |
| --- | --- | --- | --- | --- | --- |
| $Na_2O$ | 0.00% | 0.21% | 0.24% | 0.14% | 0.07% |
| MgO | 0.14% | 0.88% | 0.07% | 0.12% | 0.69% |
| $Al_2O_3$ | 65.91% | 4.28% | 22.72% | 11.98% | 15.81% |
| $SiO_2$ | 22.64% | 16.12% | 43.98% | 69.39% | 64.99% |
| $SO_3$ | 0.00% | 6.49% | 0.52% | 0.00% | 0.45% |
| $K_2O$ | 0.55% | 3.30% | 1.75% | 4.50% | 2.71% |
| CaO | 5.53% | 46.92% | 8.25% | 6.76% | 7.97% |
| $TiO_2$ | 2.40% | 0.23% | 0.99% | 0.11% | 0.63% |
| $Mn_2O_3$ | 0.08% | 0.11% | 0.04% | 0.03% | 0.07% |
| $Fe_2O_3$ | 2.59% | 2.18% | 19.07% | 1.25% | 5.81% |
| ZnO | 0.00% | 0.14% | 0.02% | 0.00% | 0.02% |
| SrO | 0.04% | 0.02% | 0.08% | 0.01% | 0.02% |
| LOI | 0.11% | 19.11% | 2.285% | 5.71% | 0.77% |

Thus, as is evident from the tables above, high-alumina refractory aluminosilicate material may comprise a higher amount of either or both of aluminum and alumina as compared to other fillers. Thus, a binder composition comprising high-alumina refractory aluminosilicate material may comprise a higher amount of such materials. For instance, the high-alumina refractory aluminosilicate material incorporated into a binder composition according to some embodiments may comprise greater than 50 wt % mullite. In certain embodiments, the high-alumina refractory aluminosilicate material may comprise greater than any one of 30, 35, 40, 45, 50, 55, 60, 65, and 70 wt % mullite. In some embodiments, the high-alumina refractory aluminosilicate material may comprise corundum. In certain embodiments, the high-alumina refractory aluminosilicate material may comprise greater than any one of 10, 15, 20, 25, and 30% corundum. Similarly, high-alumina refractory aluminosilicate material incorporated into binder compositions according to some embodiments may include substantially no amorphous (non-crystalline) material.

The high-alumina refractory aluminosilicate material may be present in the binder compositions of some embodiments in the range of from about 20% to about 70% bwoc. The low end of the range of high-alumina refractory aluminosilicate material present in some embodiments may be any one of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, and 65% bwoc. In some embodiments, the low end of the range of the high-alumina refractory aluminosilicate material present may be a non-integer, such as any interval of tenths of percentages (or other interval) between any two of the immediately aforementioned numbers (e.g., 31.3% bwoc, 47.5% bwoc, 58.6% bwoc, etc.). The high end of the range of high-alumina refractory aluminosilicate material present in some embodiments may be any one of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70% bwoc. The high end of the range of the high-alumina refractory aluminosilicate material present may likewise, in some embodiments, be a non-integer, such as any interval of tenths of percentages (or other interval) between any two of the immediately aforementioned numbers (e.g., 29.15% bwoc, 47.5% bwoc, 48.6% bwoc, 59.68% bwoc, etc.). Thus, suitable exemplar ranges according to the foregoing may include, e.g., about 45.1%-48.5% bwoc; about 20.15%-25.20% bwoc; about 65.00%-70.00% bwoc; etc.

Furthermore, the high-alumina refractory aluminosilicate material may be included in binder compositions and/or cements of some embodiments in a crushed, powder, or other similar particulate form. In some embodiments, the binder composition and/or cement may include high-alumina refractory aluminosilicate particulates of U.S. mesh size 4 and smaller. In some embodiments, mesh size of high-alumina refractory aluminosilicate particulates may be U.S. mesh size 10 and smaller. An upper limit of U.S. mesh size of high-alumina refractory aluminosilicate particulates according to various embodiments may be any one of: 80, 70, 60, 50, 40, 35, 30, 25, 20, 18, 16, 14, 12, 10, 8, 7, 6, and 4 U.S. mesh size. Although some embodiments include no lower limit to high-alumina refractory aluminosilicate particulate size, other embodiments may include a lower size limit. For instance, a lower limit of U.S. mesh size of high-alumina refractory aluminosilicate particulates according to various embodiments may be any one of: 400, 325, 270, 230, 200, 170, 140, 120, 100, 80, 70, 60, 50, 40, 30, 25, 20, 18, 16, 14, 12, 10, 8, 7, and 6 U.S. mesh size. Thus, a binder composition and/or cement according to some embodiments may include high-alumina refractory aluminosilicate particulates sized in any one or more of the following exemplary ranges: about 400 to 80 U.S. mesh size; about 400 to 200 U.S. mesh size; about 100 to 30 U.S. mesh size; about 80 to 60 U.S. mesh size; about 80 to about 18 U.S. mesh size; etc.

The binder composition and/or cement may further comprise phosphorous material. The phosphorous material may comprise a water-soluble phosphate. Any type of soluble phosphate may be used, including, but not limited to, vitreous sodium phosphates, sodium hexametaphosphates, sodium polyphosphates, sodium tripolyphosphates, sodium orthophosphates, sodium metaphosphates, ammonium hexametaphosphates, ammonium polyphosphates, ammonium tripolyphosphates, ammonium orthophosphates, and ammonium metaphosphates. Other examples may include any hexametaphosphate, tripolyphosphate, orthophosphate, metaphosphate, and/or other polyphosphate. Further examples include a salt of any of the foregoing. Mixtures or combinations of any two or more of the foregoing may instead or in addition be employed in some embodiments. When included, it is believed that, inter alia, the soluble phosphate combines with calcium aluminate that may be present in the high alumina cement to form calcium phosphate in the form of hydroxyapatite, which may be resistant to corrosion. Other reactions between phosphorous material and aluminate materials in either or both of the high alumina cement and the high-alumina refractory aluminosilicate material may lead to corrosion-resistant products when mixed (alone or in some embodiments in the presence of water). Corrosion may in some instances be with respect to, e.g., chemicals encountered in a borehole penetrating a subterranean formation (both natural and those added during oil, gas, and other recovery operations, as well as during other subterranean operations). For example resistance may be with respect to any one or more of: flowing acid, $CO_2$, $H_2S$, and combinations thereof, among others.

The phosphorous material may be present in the binder compositions of some embodiments in the range of from about 1% to about 30% bwoc. The low end of the range of phosphorous material present in some embodiments may be any one of about 1, 2, 3, 4, 5, 6, 7, 8, 9, 10, 11, 12, 13, 14, 15, 16, 17, 18, 19, 20, 21, 22, 23, 24, 25, 26, 27, 28, and 29% bwoc. In some embodiments, the low end of the range of the phosphorous material present may be a non-integer, such as any interval of tenths of percentages (or other interval) between any two of the immediately aforementioned numbers (e.g., 1.3% bwoc, 7.5% bwoc, 8.6% bwoc, etc.). The high end of the range of phosphorous material present in some embodiments may be any one of about 2, 3, 4, 5, 6, 7, 8, 9, 10, 11, 12, 13, 14, 15, 16, 17, 18, 19, 20, 21, 22, 23, 24, 25, 26, 27, 28, 29, and 30% bwoc. The high end of the range of the phosphorous material present may likewise, in some embodiments, be a non-integer, such as any interval of tenths of percentages (or other interval) between any two of the immediately aforementioned numbers (e.g., 3.15% bwoc, 7.5% bwoc, 8.6% bwoc, 9.68% bwoc, etc.). Thus, suitable exemplar ranges according to the foregoing may include, e.g., about 4.5% bwoc-8.5% bwoc; about 2.15% bwoc-5.20% bwoc; about 6.00% bwoc-10.00% bwoc; etc.

As previously noted, the binder compositions of some embodiments may further comprise water. The water may be from any source provided that it does not contain an excess of compounds that adversely affect other compounds in the binder composition. For example, a binder composition of the present disclosure may comprise fresh water, salt water (e.g., water containing one or more salts dissolved therein), brine, seawater or any combination thereof. The water may be present in an amount sufficient to form a pumpable slurry. More particularly, the water may be present in the binder compositions of some embodiments in the range of from about 25% to about 100% bwoc. In some embodiments, the water may be present in the binder composition in an amount as little as any one of about: 25, 26, 27, 28, 29, 30, 31, 32, 33, 34, 35, 36, 37, 38, 39, 40, 41, 42, 43, 44, 45, 46, 47, 48, 49, 50, and so on in increasing integral amounts up to 170% bwoc. In some embodiments, the water may be present in an amount as little as any non-integer % bwoc between any two of the immediately aforementioned percentages. The water may be present in some embodiments in an amount as great as any one of about 40, 41, 42, 43, 44, 45, 46, 47, 48, 49, 50, and so on in increasing integral amounts up to 200% bwoc. In some embodiments, the water may be present in an amount as great as any non-integer % bwoc between any two of the immediately aforementioned percentages. Thus, the water may be present in an amount ranging from about 25 to about 50% bwoc; or from about 30.1 to about 55.5% bwoc; or from about 35% to about 45% bwoc; or from about 30% to about 100% bwoc, etc.

Any one or more of various additives may be included in the binder compositions of some embodiments, including any one or more of: set retarders, microspheres, ground rubber particles, carbon fibers, accelerants, surfactants, fluid loss control additives, weighting materials, dispersants, and the like.

For example, some embodiments may include one or more set retarders. A "set retarder" as used herein is an additive that retards the setting of binder compositions according to some embodiments. A set retarder may comprise a water-soluble carboxylic acid, examples of which include, but are not limited to: malic acid, lactic acid, acetic acid, tartaric acid, citric acid, and formic acid. A set retarder of some embodiments may instead or in addition comprise any one or more of the following: ammonium, alkali metals, alkaline earth metals, metal salts of sulfoalkylated lignins, hydroxycarboxy acids, copolymers comprising acrylic acid and/or maleic acid, and combinations thereof. One example of a suitable sulfoalkylate lignin comprises a sulfomethylated lignin. Suitable set retarding additives according to some embodiments are commercially available from Halliburton Energy Services, Inc. under the trade names "HR® 4," HR® 5," "HR® 7," "HR® 12," "HR® 15," "HR® 25," "SCR™ 100," and "SCR™ 500." One or more set retarders according to some embodiments may be included in amounts sufficient to retard the setting of the binder composition until a desired time after the binder composition has been placed in a subterranean formation. More particularly, the set retarder may be included in the binder compositions of some embodiments in an amount in the range of from about 0.1% to about 5.0% bwoc. In some embodiments, the set retarder(s) may be present in the binder composition in an amount as little as any one of about 0.1, 0.5, 1, 1.5, 2.0, 2.5, 3.0, 3.5, and 4.0% bwoc. In some embodiments, the set retarder(s) may be present in an amount as little as any non-integer % bwoc between any two of the immediately aforementioned percentages. The set retarder may be present in some embodiments in an amount as great as any one of about 0.5, 1, 1.5, 2.0, 2.5, 3.0, 3.5, 4.0, 4.5, and 5.0% bwoc. In some embodiments, the set retarder(s) may be present in an amount as great as any non-integer % bwoc between any two of the immediately aforementioned percentages. In some embodiments, two or more set retarders may be included in a binder composition in a combined amount in accordance with the above-listed amounts. Under some conditions, such as high temperature placement of a binder composition, a combination of retarders may positively affect either or both of set time and pump time of the binder composition.

Microspheres are another example of an additive suitable for inclusion in cement compounds of some embodiments. Microspheres may, inter alia, reduce the density of binder compositions according to some embodiments. Any microspheres that are compatible with a subterranean binder composition, e.g., that are chemically stable over time upon incorporation into the binder composition, may be used. An example of a suitable microsphere is commercially available from Halliburton Energy Services, Inc. of Houston, Tex. under the trade name "SPHERELITE®." Where included, microspheres may be present in binder compositions of some embodiments in an amount sufficient to provide a binder composition having a density in a desired range. For example, microspheres may be present in an amount in the range of from about 10%-80% bwoc. In some embodiments, microspheres may be present in the binder composition in an amount as little as any one of about 10, 15, 20, 25, 30, 35, 40, 45, 50, 55, and 60% bwoc. In some embodiments, the microspheres may be present in an amount as little as any integer or non-integer % bwoc between any two of the immediately aforementioned percentages. Microspheres may be present in some embodiments in an amount as great as any one of about 15, 20, 25, 30, 35, 40, 45, 50, 55, 60, 65, 70, 75, and 80% bwoc. In some embodiments, microspheres may be present in an amount as great as any integer or non-integer % bwoc between any two of the immediately aforementioned percentages.

Ground rubber particles are another example additive according to some embodiments. Ground rubber particles may be included, inter alia, to provide elasticity and/or ductility to the binder compositions of some embodiments. Such particles may be produced, e.g., from tires. Ground rubber particles according to some embodiments may have a mean length of less than about ¼", and they may be capable of passing through a filter having a U.S. mesh size of about 10/20 and 20/30. Where included, the ground rubber particles may be present in binder compositions of some embodiments in an amount sufficient to provide a desired degree of ductility to the binder composition, e.g., in an amount ranging from about 10% to about 30% bwoc. In some embodiments, ground rubber particles may be present in the binder composition in an amount as little as any one of about 10, 15, 20, and 25% bwoc. In some embodiments, the ground rubber particles may be present in an amount as little as any integer or non-integer % bwoc between any two of the immediately aforementioned percentages. Ground rubber particles may be present in some embodiments in an amount as great as any one of about 15, 20, 25, and 30% bwoc. In some embodiments, ground rubber particles may be present in an amount as great as any integer or non-integer % bwoc between any two of the immediately aforementioned percentages. Ground rubber particles, like microspheres, may be incorporated into the binder composition at any of various stages (e.g., dry mixing, mixing with fluid before mixing the fluid with the unhydrated cement, and/or mixing with the binder composition after it has been mixed with fluid to form a slurry).

Carbon fibers may be included in some embodiments in order to, inter alia, increase the tensile strength of the binder composition. Carbon fibers suitable for inclusion in such embodiments may have a high tensile strength and/or a high tensile modulus. In certain exemplary embodiments, the tensile modulus may be about 180 GPa or higher, and the tensile strength of the fibers may be about 3000 MPa or higher. The fibers preferably have a mean length of about 1 mm or less. In certain exemplary embodiments, the mean length of the carbon fibers is from about 50 to about 500 microns; in other embodiments, about 100 to about 200 microns. The mean fiber length may be as low as any one of about 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 250, 300, 350, 400, and 450 microns. In some embodiments, the carbon fibers may have a mean length as low as any integer or non-integer length between any two of the immediately aforementioned micron lengths. The mean fiber length may be as great as any one of about 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 250, 300, 350, 400, 450, and 500 microns. In some embodiments, the carbon fibers may have a mean length as great as any integer or non-integer length between any two of the immediately aforementioned micron lengths. Carbon fibers may be milled carbon fibers, examples of which include "AGM-94," "AGM-99," and "AGM-95" carbon fibers commercially available from Asbury Graphite Mills, Inc. of Asbury, N.J. "AGM-94" fibers, for example, have a mean length of about 150 microns and a diameter of about 7.2 microns. "AGM-99" carbon fibers, for example, have a mean length of about 150 microns and a diameter of about 7.4 microns. Generally, carbon fibers may be present in an amount sufficient to enable the set cement to achieve a desired tensile strength. The carbon fibers may be present in the binder compositions of some embodiments in an amount in the range of from about 1% to about 15% bwoc. In some embodiments, carbon fibers may be present in the binder composition in an amount as little as any one of about 1, 2, 3, 4, 5, 6, 7, 8, 9, 10, 11, 12, 13, and 14% bwoc. In some embodiments, the carbon fibers may be present in an amount as little as any non-integer % bwoc between any two of the immediately aforementioned percentages. Carbon fibers may be present in some embodiments in an amount as great as any one of about 2, 3, 4, 5, 6, 7, 8, 9, 10, 11, 12, 13, 14, and 15% bwoc. In some embodiments, carbon fibers may be present in an amount as great as any non-integer % bwoc between any two of the immediately aforementioned percentages.

As previously noted, other example additives suitable for inclusion in the binder compositions of some embodiments include accelerants, surfactants, fluid loss control additives, weighting materials, dispersants, gas-generating additives, lost-circulation materials, filtration-control additives, defoaming agents, oil-swellable particles, water-swellable particles, thixotropic additives, and combinations thereof. An example of a suitable fluid loss control additive, for example, is a styrene-butadiene latex commercial available from Halliburton Energy Services, Inc. of Duncan, Okla., under the trade designation "LATEX 3000™." Cationic starches may also be suitable fluid loss control additives. Further specific examples of additives include crystalline silica, amorphous silica, fumed silica, salts, fibers, hydratable clays, rice husk ash, elastomers, elastomeric particles, resins, latex, combinations thereof, and the like. For example, lost-circulation materials may help prevent the loss of fluid circulation into the subterranean formation, and may include cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls. By way of further example, defoaming agents may reduce tendency of binder compositions according to some embodiments to foam during mixing and/or pumping of the compositions. Examples of suitable defoaming additives include, but are not limited to, polyol silicone compounds. In addition, thixotropic additives may provide a binder composition that can be pumpable as a thin or low-viscosity fluid, but when allowed to remain quiescent attains a relatively high viscosity. Examples of suitable thixotropic additives include gypsum, water soluble carboxyalkyl, hydroxyalkyl, mixed carboxyalkyl hydroxyalkyl, cellulose, polyvalent metal salts, zirconium oxychloride with hydroxyethyl cellulose, and combinations thereof.

Additives may be incorporated into the binder compositions of various embodiments by any suitable means. For example, additives may be dry blended with the cement before the addition of a fluid such as water, by mixing with the fluid to be added to the cement, or by mixing with the cement slurry consecutively with, or after, the addition of the fluid. In some embodiments, additives may be pre-suspended in water and injected into the cement mix fluid or into the cement slurry as an aqueous slurry. In certain embodiments, liquid additives (or suspended additives, as noted) may be mixed with a fluid such as water; solid additives may be mixed with the cement; and then the fluid and cement (plus respective additives mixed therewith) may be mixed together to form a pumpable slurry. Examples of liquid additives may include set retarders, accelerants, surfactants, fluid loss control additives, and dispersants. In some embodiments, any one or more of these liquid additives may be employed in solid form instead of or in addition to their liquid form. Further examples of solid additives may include rubber particles, carbon fibers, microspheres, and weighting materials.

The binder compositions of certain embodiments may be low-density binder compositions. For example, the binder compositions of some embodiments may comprise foamed binder compositions. When foamed, the binder compositions may include an expanding additive present in an amount sufficient to foam the binder composition to a desired density. Optionally, where the binder composition is foamed, foaming agents and/or foam stabilizing agents may be included in the binder composition in order to facilitate the foaming. In some embodiments, a surfactant comprising a foaming agent and/or foam stabilizing agent may be incorporated into the binder composition. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition may include a mixture of an ammonium salt of an alkyl ether sulfate, a cocoamidopropyl betaine surfactant, a cocoamidopropyl dimethylamine oxide surfactant, sodium chloride, and water. A suitable example of such a mixture is "ZONESEAL® 2000" foaming additive, commercially available from Halliburton Energy Services, Inc. When used, the foaming agent and/or foam stabilizing agent may be present in the binder compositions of some embodiments in an amount sufficient to generate a stable foam. In certain exemplary embodiments, the foaming agent and/or foam stabilizing agent may be present in an amount ranging from about 0.5% to about 5% by weight of water in the composition; in other embodiments, in a range from about 1% to about 2% by weight of water. In addition, an expanding additive may be used to foam the binder composition of some embodiments. A gas such as air, nitrogen, or a mixture of both, maybe used. In certain exemplary embodiments, nitrogen may be used. Where included, the expanding additive may be present in the binder composition in an amount sufficient to adjust the density of the binder composition to a desired value. In certain exemplary embodiments where an expanding additive has been added to the binder composition, the foamed binder composition may have a density in the range of from about 10.5 to about 17.5 lb/gal, or in some embodiments in the range of from about 11.5 to about 12.5 lb/gal.

Foamed binder compositions may be prepared in accordance with any suitable mixing technique. For example, a quantity of water may be introduced into a cement blender, followed by the cement comprising the high alumina cement, phosphate material, and the high-alumina refractory aluminosilicate material. The mixture may be agitated for a sufficient period of time to form a pumpable non-foamed slurry. The slurry may then be pumped to the well bore and the foaming agent and/or foam stabilizing agent followed by the expanding additive may be injected into the slurry on the fly. As the slurry and expanding additive flow through the well bore to the location where the resulting foamed binder composition is to be placed, the binder composition may be foamed and stabilized. Other additives used, if any, may be added to the water prior to when the components of the cement are mixed therewith, and/or the other additives may be added to the cement prior to mixing.

While binder compositions according to various embodiments may be suitable for a number of different cementing operations, they may be particularly suitable for methods of cementing in a subterranean formation. For example, a binder composition according to some embodiments may be used in primary and/or remedial cementing operations in which the binder composition may be introduced into a subterranean formation and allowed to set. As used herein, introducing the binder composition into a subterranean formation includes introduction into any portion of the subterranean formation, including, without limitation, into a well bore drilled into the subterranean formation, into a near well bore region surrounding the well bore, or into both. Moreover, introducing the binder composition into the subterranean formation is intended to encompass introduction of the binder composition into one or more subterranean formations that are penetrated by the well bore.

In primary cementing embodiments, for example, a binder composition comprising water, a high alumina cement, a high-alumina refractory aluminosilicate material, and phosphorous material may be introduced into an annulus in a well bore and allowed to set therein. The annulus may include, for example, an annular space between a conduit (e.g., pipe string, surface casing, intermediate casing, production casing, liner, etc.) and a wall of a well bore or between the conduit and a larger conduit in the well bore. The set binder composition may, among other things, fix the conduit in the well bore. Among other things, the binder composition may form a barrier, preventing the migration of fluids in the well bore. The binder composition also may, for example, support the conduit in the well bore.

In remedial cementing embodiments, a binder composition comprising water, a high alumina cement, a high-alumina refractory aluminosilicate material, and phosphorous material may be used, for example, in squeeze-cementing operations or in the placement of plugs. By way of example, the binder composition may be placed in a well bore to plug an opening, such as a void or crack, in the formation, in a gravel pack, in the conduit, in a cement sheath, and/or a microannulus between the cement sheath and the conduit. In another embodiment, the binder composition may be placed into a well bore to form a plug in the well bore with the plug, for example, sealing the well bore.

In some embodiments, a binder composition comprising water, a high alumina cement, a high-alumina refractory aluminosilicate material, and phosphorous material may set and/or cure at relatively low temperatures, i.e., temperatures less than about 200° F., 190° F., 180° F., 170° F., 160° F., 150° F., 140° F., 130° F., 120° F., 110° F., 100° F., or lower. In other embodiments, the binder composition may set and/or cure at temperatures of approximately 200° F. In certain embodiments, either of setting and curing may take place at extreme temperatures, such as temperatures at or above 300° F., or in some embodiments, at or above 350° F. In some embodiments, setting and/or curing may take place at or above any one or more of about 400° F., 450° F., 500° F., 550° F., and 600° F. Pressures at any one or more of the aforementioned temperatures may range from 2,000 psi to 35,000 psi. Lower pressure limits may include any integral or non-integral number within that range. Upper pressure limits likewise may include any integral or non-integral number within that range. Thus, pressure set ranges according to some embodiments may include, e.g., any of: 2,000-3,000 psi; 2,500-2,750 psi; 3,050 psi-5,075 psi; 7,500 psi-10,000 psi; 9,000 psi-15,000 psi; 9,000 psi-25,000 psi; 10,000 psi-30,000 psi; 25,000-30,000 psi; etc. As used herein, "set" or "setting" refers to the process of a material such as a binder composition according to some embodiments hardening from a slurry state to a solidified state. For example, "setting" may refer to a material hardening due at least in part to hydration reactions in the presence of water. In some embodiments, setting may be particular to placement of material such as a binder composition in suitable conditions (e.g., suitable temperature and/or pressure). Such placement may be downhole, in accordance with some embodiments. "Curing," as used herein, refers to the phenomenon that a set material may undergo when subjected to continued and/or greater temperature and/or pressure conditions. Thus, "curing" includes subsequent treatment and/or exposure of a set material to particular conditions (which may be similar to the conditions at which the material initially set, or which may be different, such as in the case of higher temperature and/or pressure conditions).

Some embodiments may include setting at a first, lower, temperature and/or pressure followed by continued treatment (e.g., curing) at a higher temperature and/or pressure. For example, a binder composition may first be set at a temperature of about 200° F. or less, and subsequently subjected to a higher temperature of about 400° F. or more, which may further lead to curing of the composition. Either of the first setting and the curing may take place at any other temperature from the above-listed temperatures for setting in various embodiments. Setting in some embodiments may take place by any suitable means, for example, hydrothermal treatment. In some embodiments, setting may result from placement downhole, followed by exposure to the conditions naturally encountered in a downhole environment (e.g., heightened temperature and/or pressure). Thus, setting may include subjecting a binder composition to temperature and/or pressure conditions at a bottomhole location wherein the composition is to be set. Setting in some embodiments may instead or in addition include subjecting the binder composition to at least one of: an enhanced oil recovery technique (such as a fire flood and/or steam pumping operation); a disposal operation (such as an acid gas disposal operation); and combinations thereof. Any such technique and/or operation may, in some instances, increase the temperature and/or pressure at which the binder composition is set. In certain embodiments, setting may instead or in addition include subjecting the binder composition to production conditions (e.g., production of hydrocarbon and/or other materials produced from a subterranean formation). Likewise, curing may include subjecting a binder composition, once set, to at least one of: an enhanced oil recovery technique (such as a fire flood and/or steam pumping operation); a disposal operation (such as an acid gas disposal operation); and combinations thereof. And curing may also or instead include allowing the binder composition, once set, to be exposed to one or more compounds produced from a subterranean formation (e.g., hydrocarbons, formation water, or any other produced compound). Such exposure may include high-temperature and/or pressure conditions. In some embodiments, higher set temperatures and/or pressures may modify the chemistry that the binder composition undergoes during setting. For example, higher temperature may shift reaction products such that the set composition, after setting, comprises different products and/or crystal structures than when set at lower temperatures. Similarly, curing at higher temperatures may modify the chemistry of the binder composition after it has set. For example, curing at extreme temperature and/or pressure may result in chemical transformations that give rise to high temperature crystalline phases within the set binder composition. In some instances, such processes may be similar to annealing. Accordingly, binder compositions of some embodiments may be capable of not only withstanding extreme conditions, but also adapting to further exposure to such conditions. Thus, such binder compositions may be suitable for use in any operation with extreme high temperature conditions such as production, injection, enhanced recovery techniques, fire floods, steam pumping, etc.

The exemplary binder compositions disclosed herein may directly or indirectly affect one or more components or pieces of equipment associated with the preparation, delivery, recapture, recycling, reuse, and/or disposal of the disclosed binder compositions. For example, the disclosed binder compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary binder compositions. The disclosed binder compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed binder compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 1:
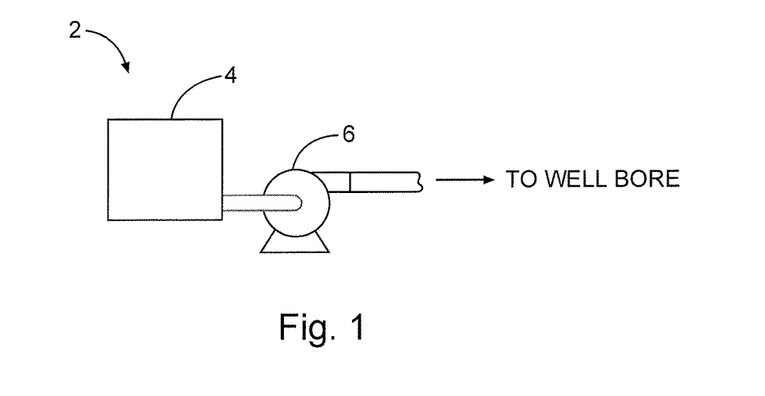
FIG. 1 illustrates a system for preparation and delivery of a binder composition to a well bore in accordance with aspects of the present disclosure.

Referring now to FIG. 1, preparation of a binder composition in accordance with example embodiments will now be described. FIG. 1 illustrates a system 2 for preparation of a binder composition and delivery to a well bore in accordance with certain embodiments. As shown, the binder composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the cement with the water as it is being pumped to the well bore.

Figure 2A:
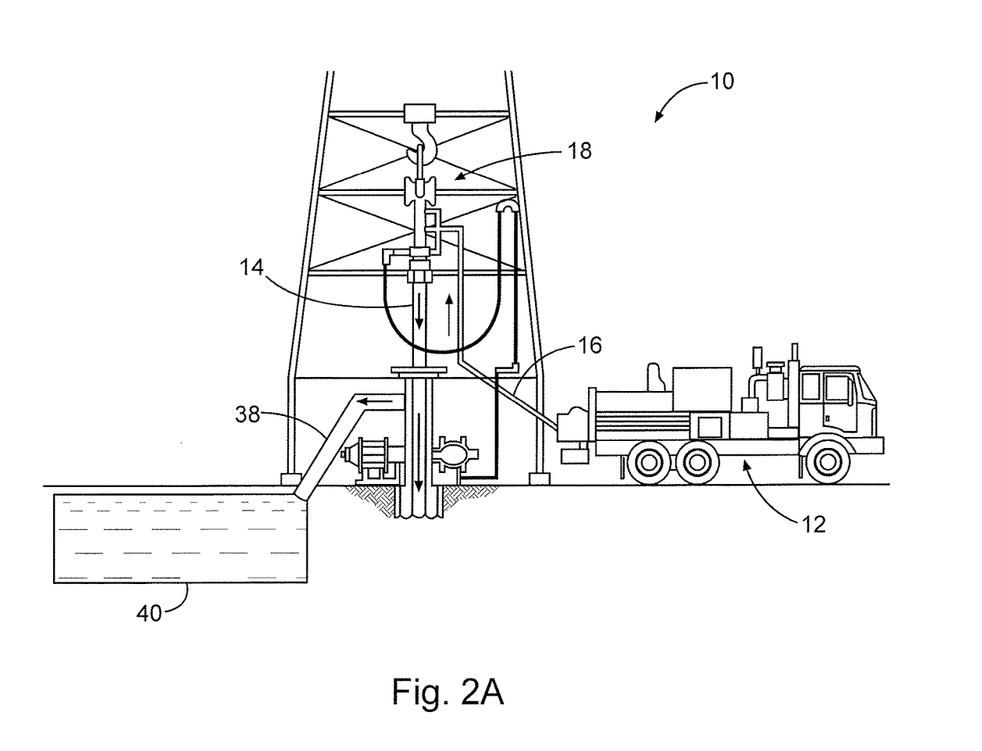
FIG. 2A illustrates surface equipment that may be used in placement of a binder composition in a well bore in accordance with aspects of the present disclosure.

An example technique for placing a binder composition into a subterranean formation will now be described with reference to FIGS. 2A and 2B. FIG. 2A illustrates surface equipment 10 that may be used in placement of a binder composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a binder composition 14 through a feed pipe 16 and to a cementing head 18 which conveys the binder composition 14 downhole.

Figure 2B:
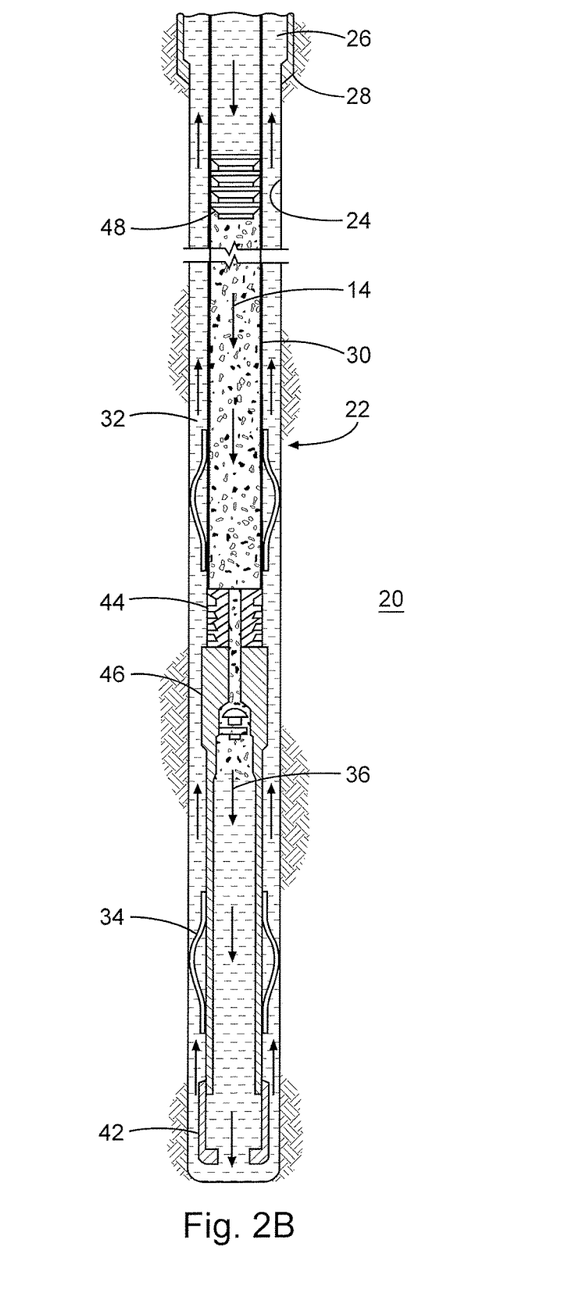
FIG. 2B illustrates placement of a binder composition into a well bore annulus in accordance with aspects of the present disclosure.

Turning now to FIG. 2B, the binder composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the binder composition 14 may be pumped down the interior of the casing 30. The binder composition 14 may be allowed to flow down the interior of the casing 30 through the casing shoe 42 at the bottom of the casing 30 and up around the casing 30 into the well bore annulus 32. The binder composition 14 may be allowed to set in the well bore annulus 32, for example, to form a cement sheath that supports and positions the casing 30 in the well bore 22. While not illustrated, other techniques may also be utilized for introduction of the binder composition 14. By way of example, reverse circulation techniques may be used that include introducing the binder composition 14 into the subterranean formation 20 by way of the well bore annulus 32 instead of through the casing 30.

As it is introduced, the binder composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may be introduced into the well bore 22 ahead of the binder composition 14, for example, to separate the binder composition 14 from the fluids 36 that may be inside the casing 30 prior to cementing. After the bottom plug 44 reaches the landing collar 46, a diaphragm or other suitable device ruptures to allow the binder composition 14 through the bottom plug 44. In FIG. 2B, the bottom plug 44 is shown on the landing collar 46. In the illustrated embodiment, a top plug 48 may be introduced into the well bore 22 behind the binder composition 14. The top plug 48 may separate the binder composition 14 from a displacement fluid 50 and also push the binder composition 14 through the bottom plug 44.

In some embodiments, the present disclosure may provide a binder composition comprising: water and a cement that comprises a high alumina cement; high-alumina refractory aluminosilicate material comprising alumina and silica in a ratio of alumina to silica greater than about 0.7; and phosphorous material.

In certain embodiments, the present disclosure may provide a method of cementing comprising: introducing a binder composition into a subterranean formation, wherein the binder composition comprises a slurry comprising water, a high alumina cement, high-alumina refractory aluminosilicate material comprising alumina and silica in a ratio of alumina to silica greater than about 0.7, and phosphorous material; and allowing the binder composition to set.

To facilitate a better understanding of the present disclosure, the following examples of some of the exemplary embodiments are given. In no way should such examples be read to limit the scope of the invention.

Example 1

A pair of sample binder composition slurries according to some embodiments were prepared with compositions as shown in Table 3.

TABLE 3

Sample Binder Composition Slurries

|  | I | | | II | | |
|---|---|---|---|---|---|---|
| Material | Amt | Unit | Mass (g) | Amt | Unit | Mass (g) |
| Water | 39.00 | % bwoc | 312 | 39.00 | % bwoc | 312 |
| Secar 71 | 47.50 | % bwoc | 380 | 47.50 | % bwoc | 380 |
| Firebrick Grog A | 47.50 | % bwoc | 380 | — | — | — |
| Firebrick Grog B | — | — | — | 47.50 | % bwoc | 380 |
| SHMP | 5.00 | % bwoc | 40 | 5.00 | % bwoc | 40 |
| FDP-C919-09 | 0.50 | % bwoc | 4 | 0.50 | % bwoc | 4 |
| FE-2 | 1.00 | % bwoc | 8 | 1.00 | % bwoc | 8 |

In Table 3, Secar 71 is a high alumina cement; SHMP is sodium hexametaphosphate, an example of a phosphorous material according to some embodiments. FDP-C919-09 and FE-2 are each set retarder additives. Firebrick Grog A comprises firebrick particulates sized to fit through 30 U.S. mesh size sieves; Firebrick Grog B comprises firebrick particulates sized to fit through 70 U.S. mesh size sieves.

Figure 3A:
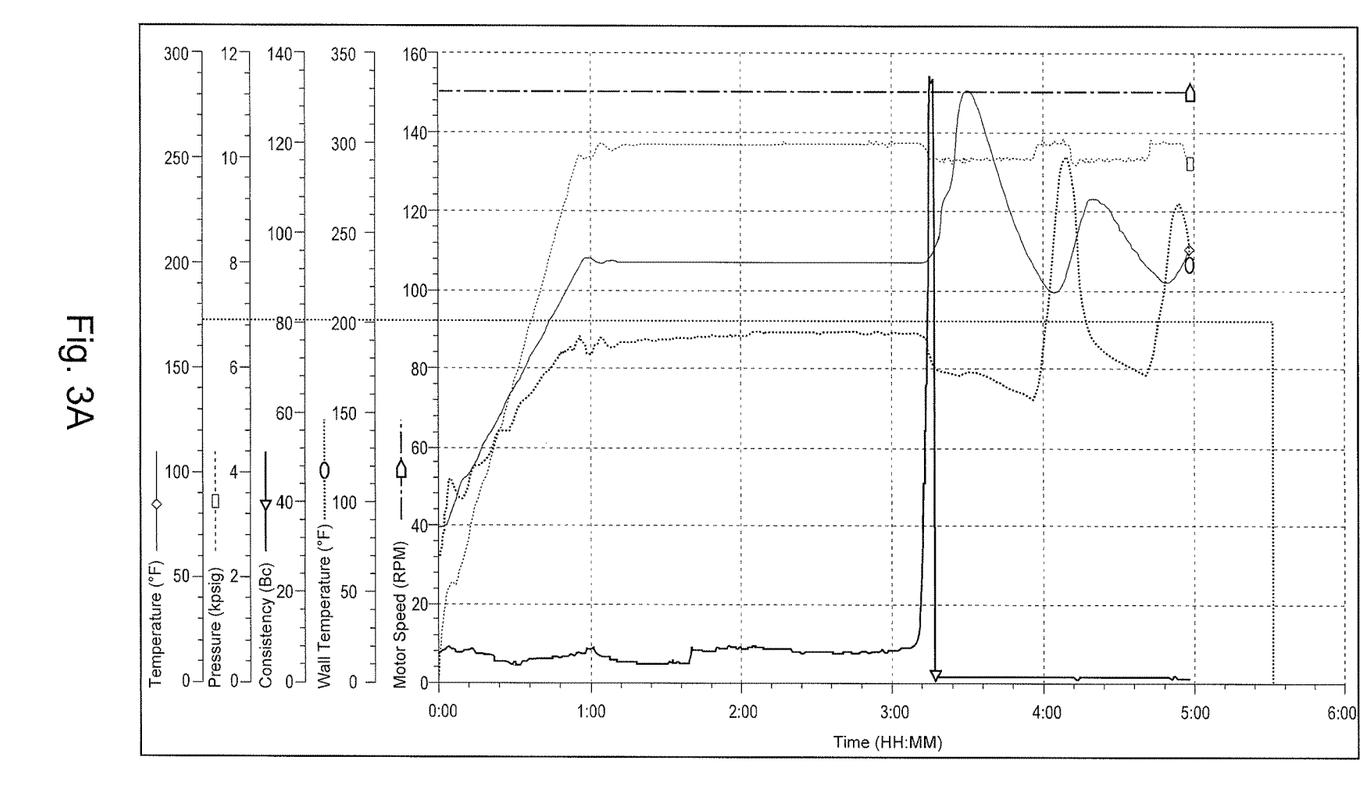
FIGS. 3A and 3B are charts showing various properties as functions of time for sample binder compositions in accordance with aspects of the present disclosure.
Figure 3B:
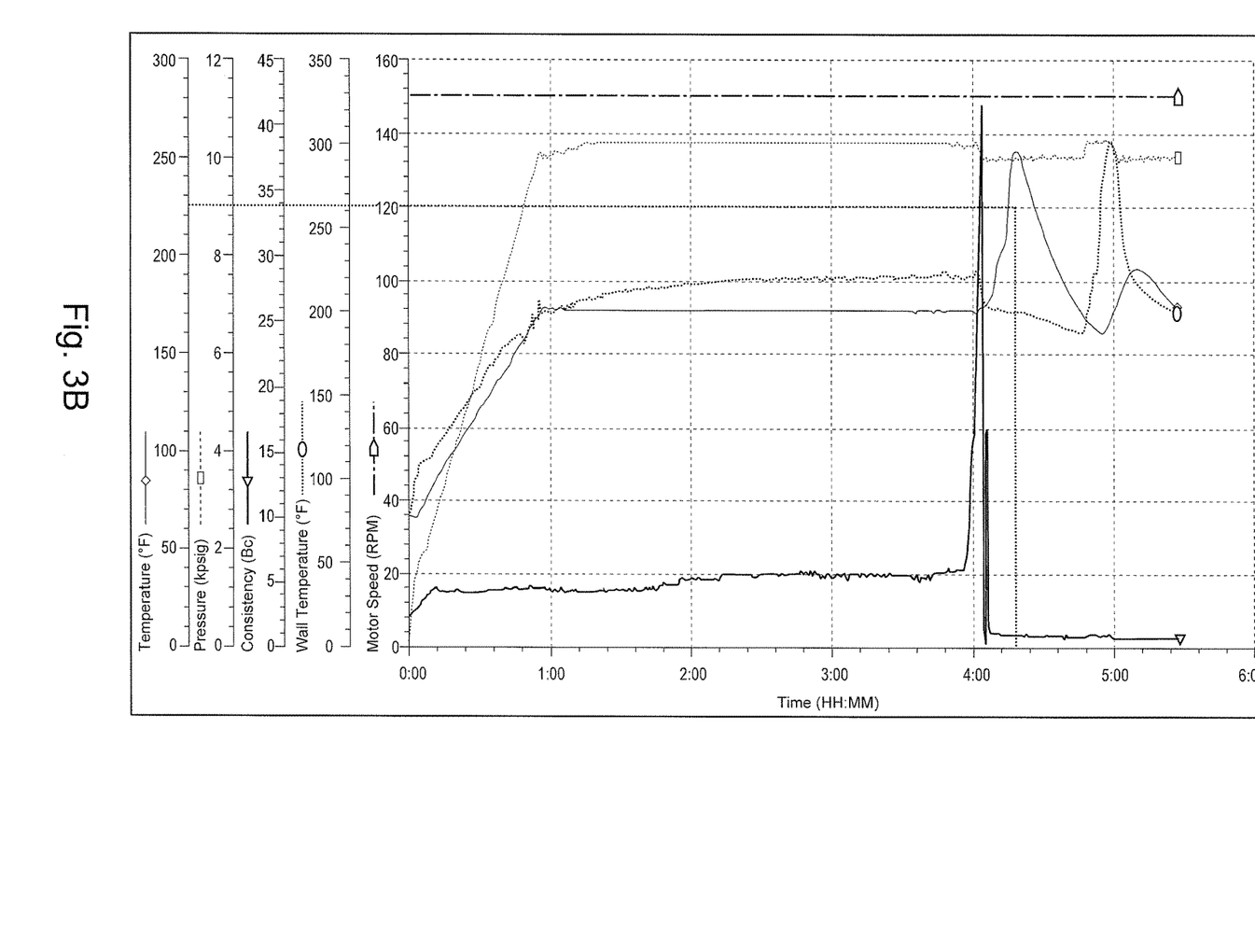

Sample I and II each were set at 200° F. at about 10,000 psi in an autoclave. Each slurry sample reached a consistency of approximately 70 Bearden Factor (Bc) in roughly 3 to 4 hours (3:14:00 for Sample I; 4:04:30 for Sample II). FIGS. 3A and 3B are charts showing each of temperature, pressure, consistency, wall temperature, and motor speed as functions of time in the curing of each of Sample I and II, respectively. Temperature, pressure, and consistency refer to such properties of the slurry sample. Wall temperature refers to the temperature at the wall of the autoclave chamber (where the heating element is located). Motor speed refers to the rotational speed of the mixing paddle that agitates the binder composition slurry sample during the test, and is measured in revolutions per minute (RPM).

Example 2

Two sample slurries were prepared according to the composition of Sample II from Table 3. One slurry was set at 190° F. for 24 hours in a water bath. The other was likewise set at 190° F. for 24 hours in a water bath, then transferred to an autoclave and further cured at 550° F. for 7 days. Results of compressive strength for each sample as shown in Table 4 show that the composition according to Sample II continued to gain strength while exposed to the high temperature conditions in the autoclave during the second curing process.

TABLE 4

Compressive Strength Following Cures of Sample II Slurry

| Sample | Compressive Str. (psi) | Cure Temp (° F.) | Cure Time | Cure Pressure (psi) |
|---|---|---|---|---|
| II | 2959.5 | 190 | 24 h | atmosphere |
| II | 3758.66 | 550 | 7 d | 2000 |

XRD compositional analysis (Table 5) based upon XRD diffraction patterns that the high-temperature (550° F.) cure led to compositional changes in the binder composition as set at 190° F.

TABLE 5

XRD Analysis of Sample II Cures

|  |  | Cured at 190° F. | Cured at 550° F. |
|---|---|---|---|
| Mullite | $Al_6Si_2O_{13}$ | 44% | 31% |
| Corundum | $Al_2O_3$ | trace | 1% |
| Quartz | $SiO_2$ | 6% | 3% |
| Cristobalite | $SiO_2$ | 12% | 1% |
| Calcite | $CaCO_3$ | 1% | 2% |
| Dmisteinbergite | $CaAl_2Si_2O_8$ | 1% | 38% |
| Boehmite | AlOOH | 7% | 18% |
| Rankinite | $Ca_3Si_2O_7$ | 2% | 4% |
| Ettringite | $Ca_6Al_2(SO4)_3(OH)_{12}$ $24H_2O$ | 1% | 2% |
| Katoite | $Ca_3Al_2(SiO_{12})_3(OH)_4$ | 21% | — |
| Wollastonite | $CaSi_2O_3$ | 5% | — |
| Gibbsite | $Al(OH)_3$ | — | — |
| Additional amorphous | non-crystalline | Moderate | — |

Figure 4A:
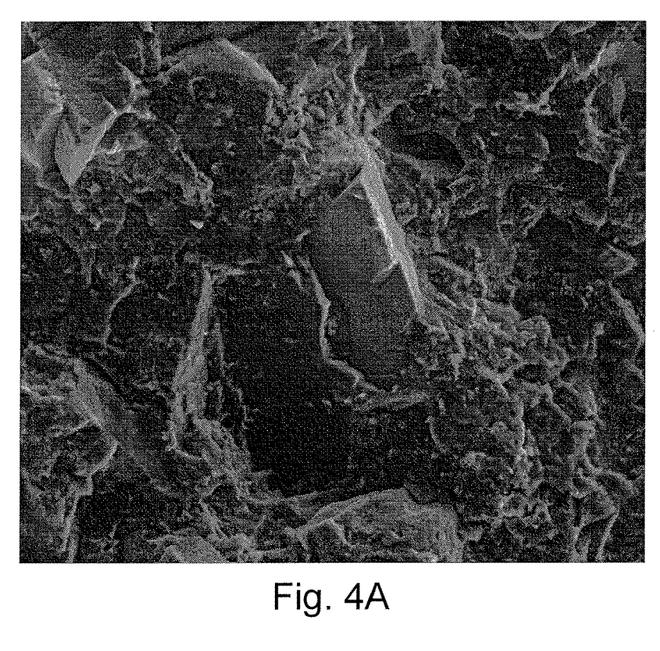
FIGS. 4A and 4B are scanning electron microscopy (SEM) images of sample binder compositions in accordance with aspects of the present disclosure.
Figure 4B:
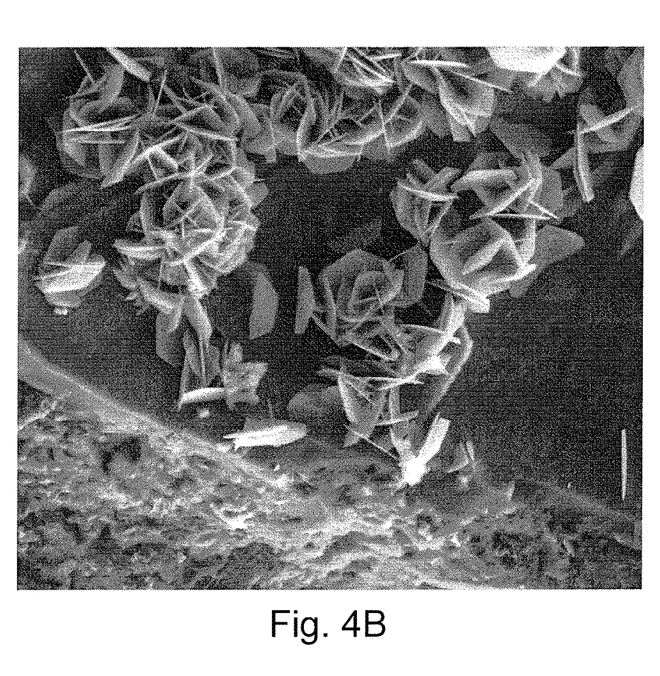

For example, as shown in Table 5, mullite was present in reduced amounts in the samples cured at 550° F. as compared to the 190° F. set. Furthermore, crystalline silica, katoite, wollastonite, and unidentified amorphous material were present in appreciable amounts in the sample that set at 190° F., but were not present in a sample following 550° F. cure. On the other hand, the 550° F. cure contained appreciable amounts of hexagonal $CaAl_2Si_2O_8$ (dmisteinbergite) and AlOOH (boehmite). As indicated by FIGS. 4A and 4B, which show 400× and 500× magnified scanning electron microscopy (SEM) images of the 190° F. set and 550° F. cure, respectively, it appears that the higher temperatures may have caused materials in the sample to crystallize to a greater degree than seen in the 190° F. cure. This conclusion is confirmed by the XRD analysis showing little or no amorphous material in the 550° F. cure sample.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of cementing comprising:
   introducing a binder composition into a subterranean formation, wherein the binder composition comprises a slurry comprising:
   water,
   a high alumina cement,
   a high-alumina refractory aluminosilicate material comprising alumina and silica in a ratio of alumina to silica greater than about 0.7 and comprising a compound selected from the group consisting of: crushed firebrick, firebrick grog, refractory mortar, fire clay, and combinations thereof,
   a set retarder selected from the group consisting of: ammonium, a copolymer comprising acrylic acid and/or maleic acid, and any combination thereof, wherein the set retarder is present in an amount in the range of from about 0.5% to about 5.0% by weight of the cement; and
   a phosphorous material, wherein the phosphorous material is present in the binder composition in an amount in the range of from about 15% to about 30% by the combined weight of the high alumina cement, the high-alumina refractory aluminosilicate material, and the phosphorous material, the high alumina cement is present in the binder composition in an amount in the range of from about 20% to about 70% by the combined weight of the high alumina cement, the high-alumina refractory aluminosilicate material, and the phosphorous material, and the high-alumina refractory aluminosilicate material is present in an amount in the range of from about 20% to about 50% by the combined weight of the high alumina cement, the high-alumina refractory aluminosilicate material, and the phosphorous material; and
   allowing the binder composition to set at a temperature above 400° F.

2. The method of claim 1 wherein the binder composition comprises high-alumina refractory aluminosilicate particulates sized 30 U.S. mesh or smaller.

3. The method of claim 1 wherein allowing the binder composition to set comprises allowing the binder composition to set at a temperature of about 550° F. or higher.

4. The method of claim 3 further comprising curing the binder composition at a temperature of about 400° F. or higher subsequent to allowing the binder composition to set.

5. The method of claim 4 wherein curing the binder composition comprises carrying out at least one of an enhanced oil recovery technique and a disposal operation.

6. The method of claim 1 further comprising mixing one or more of the high alumina cement, the high-alumina refractory aluminosilicate material, and the phosphorous material with the water using mixing equipment.

7. The method of claim 1 wherein the binder composition is introduced into a subterranean formation using one or more pumps.

8. A binder composition comprising:
   water and
   a cement that comprises
   a high alumina cement;
   a high-alumina refractory aluminosilicate material comprising alumina and silica in a ratio of alumina to silica greater than about 0.7;
   a set retarder selected from the group consisting of: ammonium, a copolymer comprising acrylic acid and/or maleic acid, and any combination thereof, wherein the set retarder is present in an amount in the range of from about 0.5% to about 5.0% by weight of the cement; and
   a phosphorous material, wherein the phosphorous material is present in the binder composition in an amount in the range of from about 15% to about 30% by the combined weight of the high alumina cement, the high-alumina refractory aluminosilicate material, and the phosphorous material and the high alumina cement is present in the binder composition in an amount in the range of from about 20% to about 70% by combined weight of the high alumina cement, the high-alumina refractory aluminosilicate material, and the phosphorous material, and the high-alumina refractory aluminosilicate material is present in an amount in the range of from about 20% to about 50% by the combined weight of the high alumina cement, the high-alumina refractory aluminosilicate material, and the phosphorous material.

9. The binder composition of claim 8 wherein the high alumina cement comprises a calcium aluminate.

10. The binder composition of claim 8 wherein the high-alumina refractory aluminosilicate material comprises mullite in an amount greater than 50 wt % of the high-alumina refractory aluminosilicate material.

11. The binder composition of claim 10 wherein the high-alumina aluminosilicate is substantially devoid of amorphous material.

12. The binder composition of claim 8 wherein the phosphorous material comprises a compound selected from the group consisting of: phosphate, hexametaphosphate, tripolyphosphate, orthophosphate, metaphosphate, polyphosphate, a salt of any one of the foregoing, and combinations thereof.

13. The binder composition of claim 8 wherein the water is present in the binder composition in an amount sufficient to form a pumpable slurry comprising the binder composition.

14. The binder composition of claim 8 further comprising a second set retarder.

15. The binder composition of claim 8 further comprising:
   an expanding additive in an amount sufficient to foam the binder composition; and
   a compound selected from the group consisting of foaming agents, foam stabilizing agents, and combinations thereof.

16. The composition of claim 8 wherein the high-alumina refractory aluminosilicate material comprises crushed firebrick or firebrick grog.

* * * * *